United States Patent [19]

Browalski et al.

[11] Patent Number: 4,946,015
[45] Date of Patent: Aug. 7, 1990

[54] VEHICLE TRACTION CONTROL SYSTEM

[75] Inventors: Edmund S. Browalski, W. Bloomfield; Philip E. Nimmo, IV, Fenton, both of Mich.

[73] Assignee: General Motors Corporation, Detroit, Mich.

[21] Appl. No.: 350,272

[22] Filed: May 11, 1989

[51] Int. Cl.⁵ .............................................. F16D 25/14
[52] U.S. Cl. ................................. 192/1.23; 192/1.22; 192/1.24; 180/197; 364/426.03
[58] Field of Search ................... 192/1.22, 1.23, 1.24; 180/197; 364/426.03

[56] References Cited

U.S. PATENT DOCUMENTS

| | | | |
|---|---|---|---|
| 4,625,824 | 12/1986 | Leiber | 180/197 |
| 4,685,547 | 8/1987 | Ohashi et al. | 180/197 |
| 4,733,760 | 3/1988 | Inagaki et al. | 192/1.23 |
| 4,760,893 | 8/1988 | Sigl et al. | 364/426.03 |
| 4,765,430 | 8/1988 | Schulze et al. | 180/197 |
| 4,766,972 | 8/1988 | Takata et al. | 180/197 |
| 4,779,202 | 10/1988 | Leiber | 364/426.03 |

Primary Examiner—Leslie A. Braun
Assistant Examiner—Nicholas Whitelaw
Attorney, Agent, or Firm—Howard N. Conkey

[57] ABSTRACT

When an excessive acceleration spin condition is detected in one or both of the driven wheels of a vehicle, braking pressure is applied to one or both wheel brakes to quickly take control of the respective excessive spin condition. A value representing the total engine torque being absorbed by both driven wheel brakes above a predetermined low value is determined from which a desired engine torque reduction amount is determined. The actual engine torque output value is determined and reduced by the desired engine torque reduction amount resulting in a desired value of engine torque output. The engine torque output is then decreased to the desired engine torque output.

6 Claims, 8 Drawing Sheets

VEHICLE TRACTION CONTROL SYSTEM

BACKGROUND OF THE INVENTION

This invention relates to a vehicle traction control system and, more particularly to such a system which provides for such control by control of both the brakes of the driven wheels and engine torque output.

It is a common experience with automotive vehicles for excessive wheel spin to occur during vehicle acceleration when the operator initiated engine torque delivered to the vehicle driven wheels are such that the frictional forces between the tire and the road surface are overcome. While a small amount of spin between the tire and road surface is necessary in order to achieve a driving force, excessive spin results in the reduction of effective driving force and in the deterioration in the lateral stability of the vehicle.

Various methods have been proposed for preventing an excessive spinning condition of the driven wheels of a vehicle by limiting the slip between the wheel and the road surface at a value that will achieve a maximum transfer of driving force from the driven wheels to the road surface. For example, it is known that excessive acceleration spin can be quickly brought under control by application of the brakes of the spinning wheel. However, in some applications a large amount of energy must be absorbed by the brakes to overcome the excessive torque output of the engine in order to prevent excessive wheel spin. This condition may be required for substantial periods of time.

To relieve the brakes from this high load condition, it has been suggested to also reduce the engine torque output of the engine when an excessive spin condition is sensed. This control is generally slower acting in controlling spin but is effective to minimize the amount and duration of the engine torque that must be absorbed by the wheel brakes in order to limit wheel spin.

SUMMARY OF THE INVENTION

It is to such a system that includes both driven wheel brake control and engine torque output control for limiting acceleration wheel spin that this invention is directed. More specifically, this invention provides for an improved method of transferring the control of acceleration spin from the driven wheel brakes to the engine so as to minimize the energy that must be absorbed by the brakes during acceleration wheel spin control.

In accord with this invention, when an excessive acceleration spin condition is detected in one or both of the driven wheels, braking pressure is applied to one or both wheel brakes to quickly take control of the respective excessive spin condition. A value representing the total engine torque being absorbed by both driven wheel brakes above a predetermined low value is determined from which a desired engine torque reduction amount is determined. The actual engine torque output value is determined and reduced by the desired engine torque reduction amount resulting in a desired value of engine torque output. The engine torque output is then decreased to the desired engine torque output.

The forgoing steps are repeated to progressively reduce the engine torque output based on the total engine torque being absorbed by both of the wheel brakes until the excessive spin condition of the driven wheels is controlled substantially by engine torque control. As the spin condition comes under control via engine torque control, the braking pressure applied to the wheels is decreased. When total engine torque absorbed by the two driven wheel brakes decreases to below the predetermined low value, the torque output of the engine is then increased by opening the auxiliary throttle.

DESCRIPTION OF THE DRAWINGS

The invention may be best understood by reference to the following description of a preferred embodiment and the drawings in which.

Figure 1:
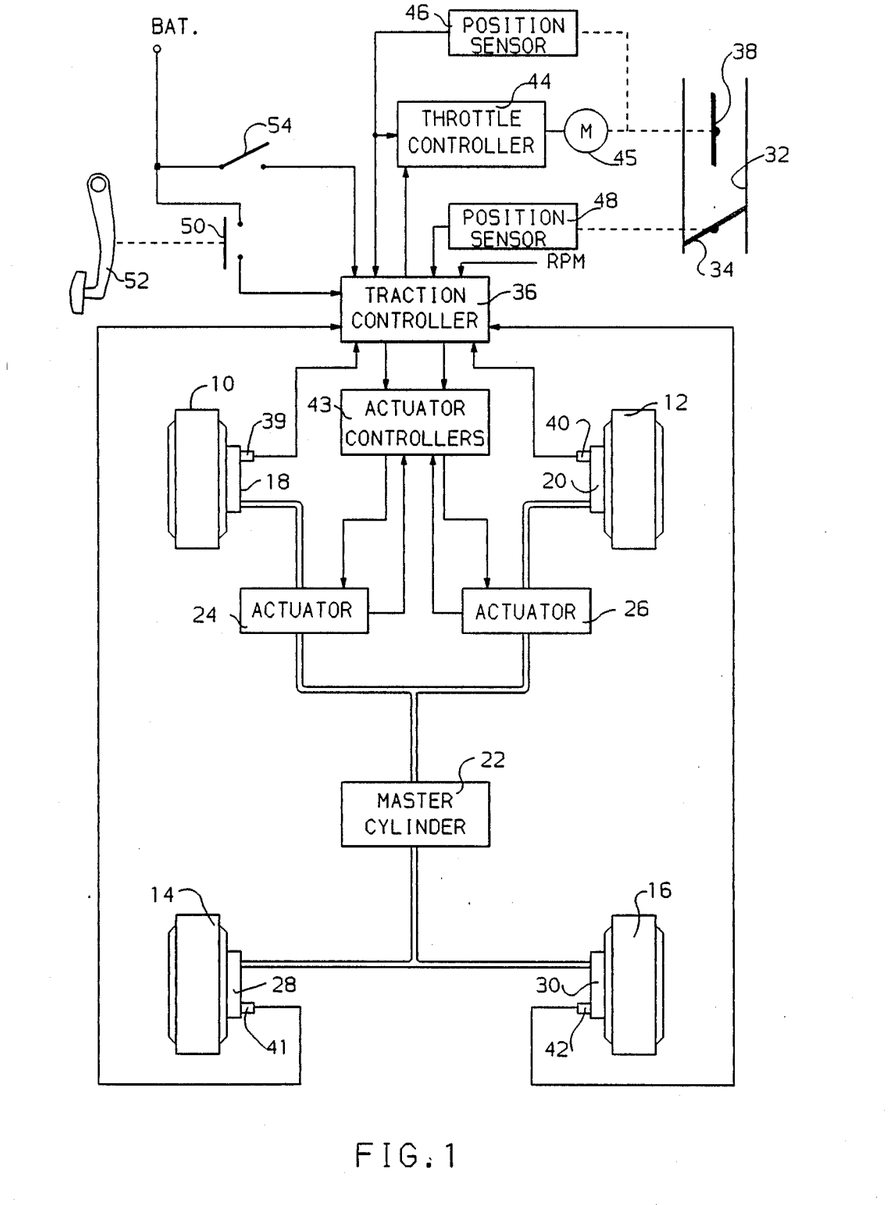
FIG. 1 is a schematic block diagram of a vehicle traction control system.

A traction control system for a front wheel drive vehicle is illustrated in FIG. 1. The vehicle has two front driven wheels 10 and 12 and two rear non-driven wheels 14 and 16. The front wheels 10 and 12 have respective hydraulic actuated brakes 18 and 20 actuated by manual operation of a conventional master cylinder 22 through a pair of traction control pressure actuators 24 and 26. As will be described, when the actuators 24 and 26 are inactive, the hydraulic fluid from the master cylinder 22 passes through the actuators 24 and 26 to the brakes 18 and 20 of the wheels 10 and 12. Thus, the actuators 24 and 26 are transparent to the braking system during normal braking of the wheels 10 and 12. Similarly, the rear wheels 14 and 16 include a pair of hydraulic actuated brakes 28 and 30 operated by hydraulic fluid under pressure from the master cylinder 22 in response to manual actuation of the brakes.

The vehicle includes an internal combustion engine, not shown, having an air intake passage 32 with a manually operable throttle valve 34 therein for regulating engine air intake and therefore engine operation in the conventional manner.

If the engine is operated so as to deliver excessive torque to the driven wheels 10 and 12, they will experience excessive spin relative to the road surface thereby reducing the tractive force and lateral stability of the vehicle. In order to limit the acceleration spin of the driven wheels 10 and 12 resulting from excess engine output torque, a traction controller 36 is provided which limits spin by operating the brakes of the driven wheels 10 and 12 and by limiting the air intake through the intake passage 32 via a motor driven auxiliary throttle valve 38.

In regard to the operation of the brakes of the wheels 10 and 12 to limit spin, a traction controller 36 monitors the wheel speeds of the left and right driven wheels 10 and 12 via speed sensors 39 and 40 and the wheel speeds of the left and right undriven wheels 14 and 16 via speed sensors 41 and 42 to determine whether or not an excessive slipping wheel condition exists. If such a condition is detected, the actuators 24 and 26 are operated via actuator controllers 43 for braking the left, right or both of the driven wheels 10 and 12 experiencing an excessive slipping condition to limit the slipping condition.

In order to limit the amount and duration of the energy absorbed by the brakes 18 and 20 in controlling wheel slip, the traction controller 36 provides for controlling engine torque by positioning the auxiliary throttle 38. This is accomplished via a throttle controller 44 which provides closed loop control of the throttle valve 38 via a motor 45 and a throttle position sensor 46 monitoring the actual position of the auxiliary throttle 38 to a position commanded by the traction controller 36.

Additional signal inputs used for controlling acceleration spin include a throttle position signal provided by a position sensor 48 monitoring the position of the throttle valve 34, a speed signal rpm representing the speed of the engine such as provided by an ignition control circuit of the engine, a brake condition signal provided by a brake switch 50 closed upon actuation of the brakes of the vehicle by the conventional brake pedal 52 and a signal provided by a manually operable disable switch 54 closed to disable traction control at the option of the vehicle operator.

Figure 2:
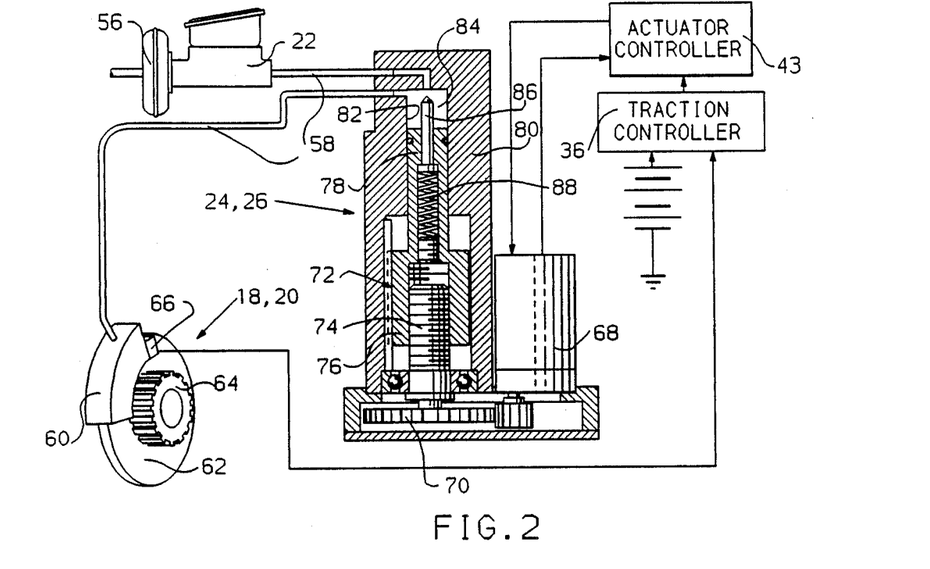
FIG. 2 is a view of the brake pressure modulator for controlling wheel brake pressure for limiting wheel spin.

Referring to FIG. 2, there is illustrated a braking system for one of the driven wheels 10 or 12 including the actuator 24,26 controlled by the traction controller 36 for limiting slip of the driven wheel. In general, the braking system is composed of a hydraulic boost unit 56 and brake lines 58 providing fluid communication with the wheel brake 18,20. The wheel brake is illustrated as a disc brake system that includes a caliper 60 located at a rotor 62 of the vehicle wheel.

A wheel speed sensing assembly at each wheel is generally comprised of an exciter ring 64 which is rotated with the wheel and an electromagnetic sensor 66 which monitors the rotation of the exciter ring to provide a signal having a frequency proportional to wheel speed. The wheel speed signals are provided to the traction controller 36 to be used to determine the wheel speed.

The actuator 24,26 is illustrated in the inactive position wherein it is transparent to the braking system. This is the actuator condition during normal vehicle braking. Each actuator in the preferred embodiment includes a DC torque motor 68 whose output shaft drives a gear train 70 whose output turns a ball screw actuator 72 comprised of a linear ball screw 74 and nut 76. As the linear ball screw rotates, the nut 76 is either extended or retracted thereby positioning a piston 78 which forms a part of the nut 76.

Each actuator includes a housing 80 in which a cylinder 82 is formed. The piston 78 is reciprocally received in the cylinder 82 and defines therewith a chamber 84. The cylinder 82 has an inlet which is connected to the master cylinder 22 and an outlet which is coupled to the brake caliper 60 of the wheel brake.

A valve member 86 is carried by and extends from the end of the piston 78. This member is spring biased within the piston 78 to an extended position as shown by a spring 88. When the piston 78 is in the retracted position illustrated, the fluid path between the master cylinder 22 and the wheel brake 18 is open. When, however, the ball screw 74 is rotated by the motor 68 to extend the nut 76 and therefore the piston 78, the valve member 86 is seated against the opening at the inlet to the chamber 84 from the master cylinder 22 to isolate the chamber 84 and the wheel brake 60 from the master cylinder 22. Once the valve 86 is seated, further extension of the piston 78 by rotation of the motor 68 then functions to pressurize the fluid at the brake 18 to apply braking forces to the wheel.

The power consumed by the DC motor 68 while controlling pressure is directly proportional to the rotational torque exerted by the motor on the gear train 70. The rotational torque is translated through the linear ball screw and nut 74 and 76 to the piston 78. The pressure present at the piston head is proportional to the wheel brake pressure. Therefore, the value of the current through the DC motor 68 is proportional to the wheel brake pressure and can be considered a measure thereof.

The ball screw actuator 72 is a high efficiency actuator so that the ball screw 74, gear train 70 and the motor output shaft are reverse driven by the hydraulic pressure acting on the piston 78, when it is greater than the torque output of the motor 68 until the hydraulic pressure is reduced to a level where it is overcome or offset by the torque output of the DC motor 68.

Figure 3:
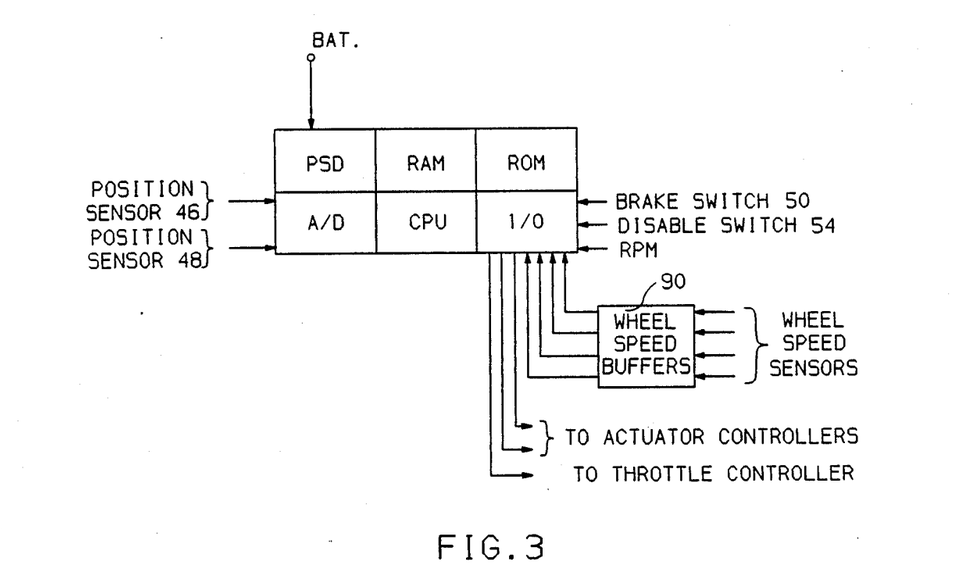
FIG. 3 is a diagram of the traction controller of FIG. 1 for controlling spinning wheel brake pressure and the air flow into the intake of the vehicle engine for control of wheel spin.

The traction controller 36 of FIG. 1 takes the form of a conventional general purpose digital computer programmed to control the slip of the driven wheels 10 and 12 in accord with the principles of this invention. As illustrated in FIG. 3, the traction controller 36 consists of a common digital computer composed of a read-only memory (ROM), a random access memory (RAM), an analog-to-digital converter (A/D), a power supply device (PSD), a central processing unit (CPU) and an input/output section (I/O) which interfaces to a wheel speed buffer circuit 90 which functions to condition the speed signal outputs of the wheel speed sensors, the actuator controllers 40, the throttle controller 42, the brake switch 50, the disable switch 54 and the speed signal rpm.

The actuator controllers 43 take the form of two conventional independent closed loop motor current controllers each of which establishes the current through the motor 68 of a respective one of the actuators 24 or 26 at a level commanded by the traction controller.

The ROM of the digital computer of FIG. 3 contains the instructions necessary to implement the control algorithm as diagrammed in the FIGS. 4–8. In describing the functions of the algorithm encoded in the ROM, reference to the tasks which have been detailed as flow diagram function blocks will be designated by <mm>, wherein mm is the diagram reference number and < > indicates that the concept described by the particular flow diagram function block text is being referenced. The text in the flow diagram function block describes the general task or process being executed by the traction controller 36 at that point. The specific programming of the ROM for carrying out the functions depicted in the flow diagrams of FIGS. 4–9 may be accomplished by standard skill in the art using conventional information processing languages.

While the digital computer of FIG. 3 may take any conventional form, one such form may be the single chip Motorola microcomputer MC—68HC11. Alternatively, multiple processors or other circuit forms may be employed. For example, a separate microcomputer may be employed to measure wheel speed and develop various wheel state variables.

Figure 4:
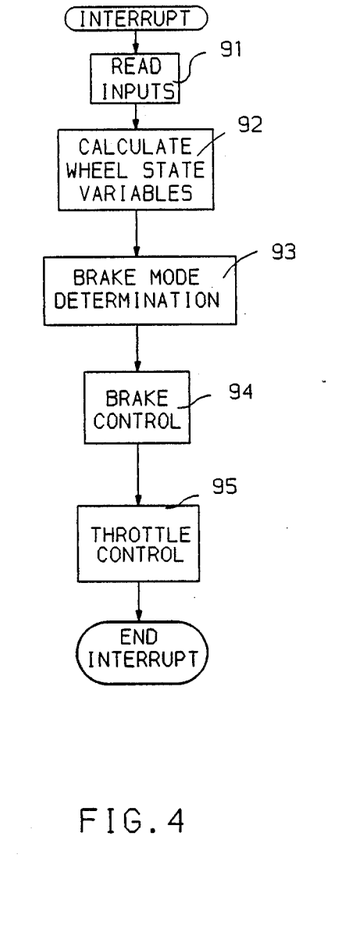
FIGS 4–7 are flow diagrams illustrating the operation of the traction controller of FIG. 1.

Referring to FIG. 4, a control cycle interrupt routine for limiting the acceleration spin of the driven wheels 10 and 12 is illustrated. This routine is executed by the traction controller 36 at constant interrupt intervals established by an internal timing circuit. For example, the interrupt routine of FIG. 4 may be executed at 10 millisecond intervals.

Upon receipt of a control cycle interrupt, the controller reads the various system inputs including wheel speeds $V_{lf}$, $V_{rf}$, $V_{lr}$ and $V_{rr}$, engine speed, the positions of the auxiliary throttle 38 and the primary throttle 34 provided by the position sensors 46 and 48 and the discrete signal states including the open or closed state of the brake switch 50 and the disable switch 54 <91> and then determines various wheel state variables <92>. The wheel state variables include filtered values of wheel velocity and acceleration for each of the vehicle wheels. The filtering may be provided by use of a standard first order lag equation. Based upon the determined velocity and acceleration values, the spin ratio of the left driven wheel 10 is determined by the expression $(V_{lf}-V_{lr})/V_{lf}$ where $V_{lf}$ and $V_{lr}$ are the determined wheel velocities of the left side wheels 10 and 14 respectively, and the spin ratio of the driven wheel 12 is determined by the expression $(V_{rf}-V_{rr})/V_{rf}$ where $V_{rf}$ and $V_{rr}$ are the determined wheel velocities of the right side wheels 12 and 16, respectively. In other words, spin is based upon the driven and undriven wheels on the same side of the vehicle. In addition, the difference in velocity (delta velocity) of the driven and undriven wheels on the same side of the vehicle is determined by the expressions $V_{lf}-V_{lr}$ for the left side wheels 10 and 14 and $V_{rf}-V_{rr}$ for the right side wheels 12 and 16. The final wheel state variables determined are the difference in acceleration (delta acceleration) of the driven and undriven wheels and 'energy' terms related to the difference between the squared velocities of the driven and undriven wheels on each side of the vehicle.

Once the wheel state variables have been determined, the program determines the proper mode of operation of the brake actuators <93> and performs the necessary I/O with the brake <94> and throttle <95> actuators to control wheel spin to appropriate values.

At this point, it should be noted that unless a program function specifically relates to both wheels, the control cycle interrupt routine is selectively conditioned for performing steps associated with one or the other left or right driven wheel 10 or 12. Accordingly, parameters associated with one of the driven wheels are selected depending upon which wheel the routine is conditioned for. It will be assumed that the routine is first conditioned for the left driven wheel 10 <96>.

In the Brake Mode Determination routine (FIG. 5), the program evaluates the status of the brake pedal switch 50 <97> and the status of the manually operated disable switch 54 <98>. The sensed closure of either one of these switches represents a condition not requiring acceleration slip control and the program exits the routine. However, if neither of the switches 50 and 54 is closed, the program continues to evaluate the wheel variables to determine if brake actuation is required. The initial step in this process is to determine the brake motor current correction factor.

Figure 5A:
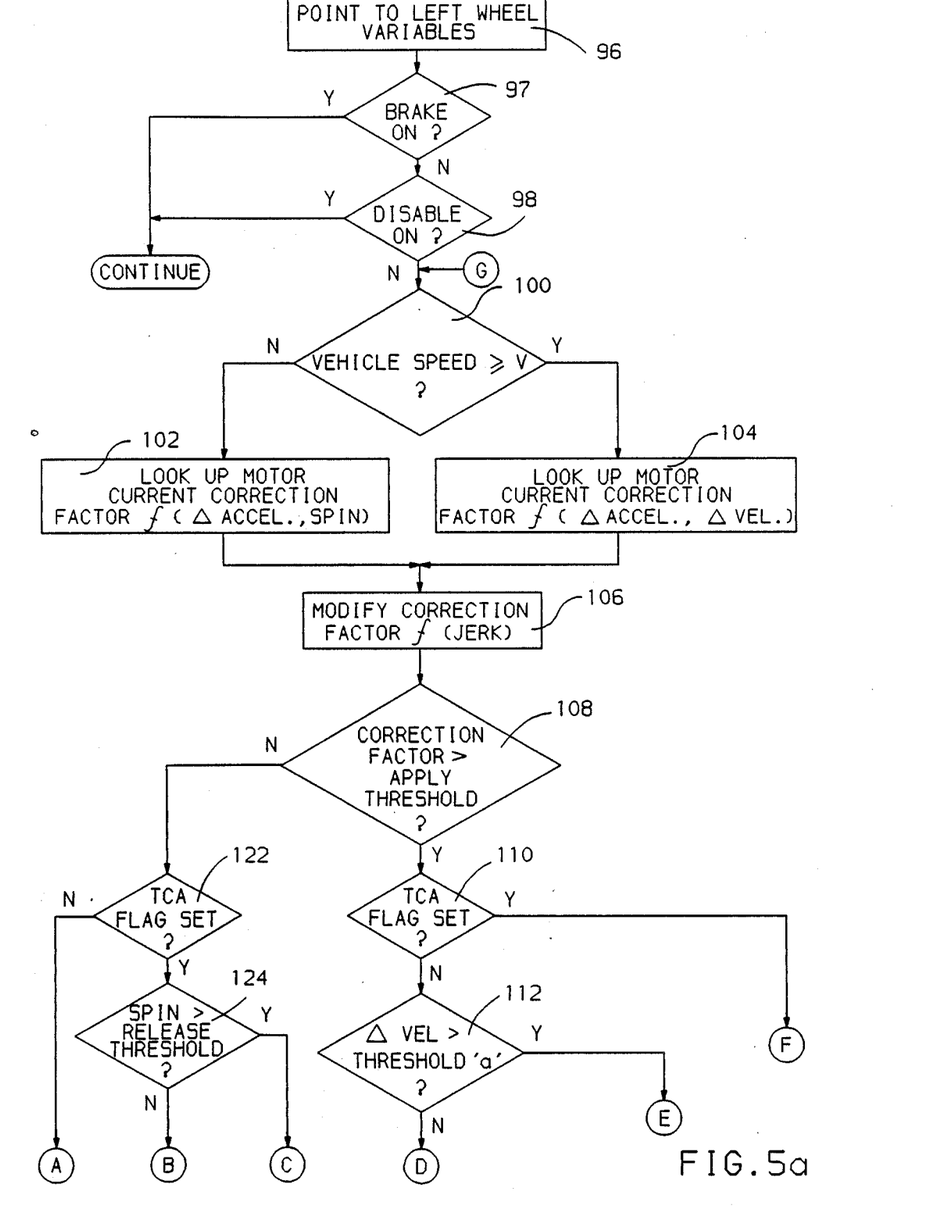
Figure 5B:
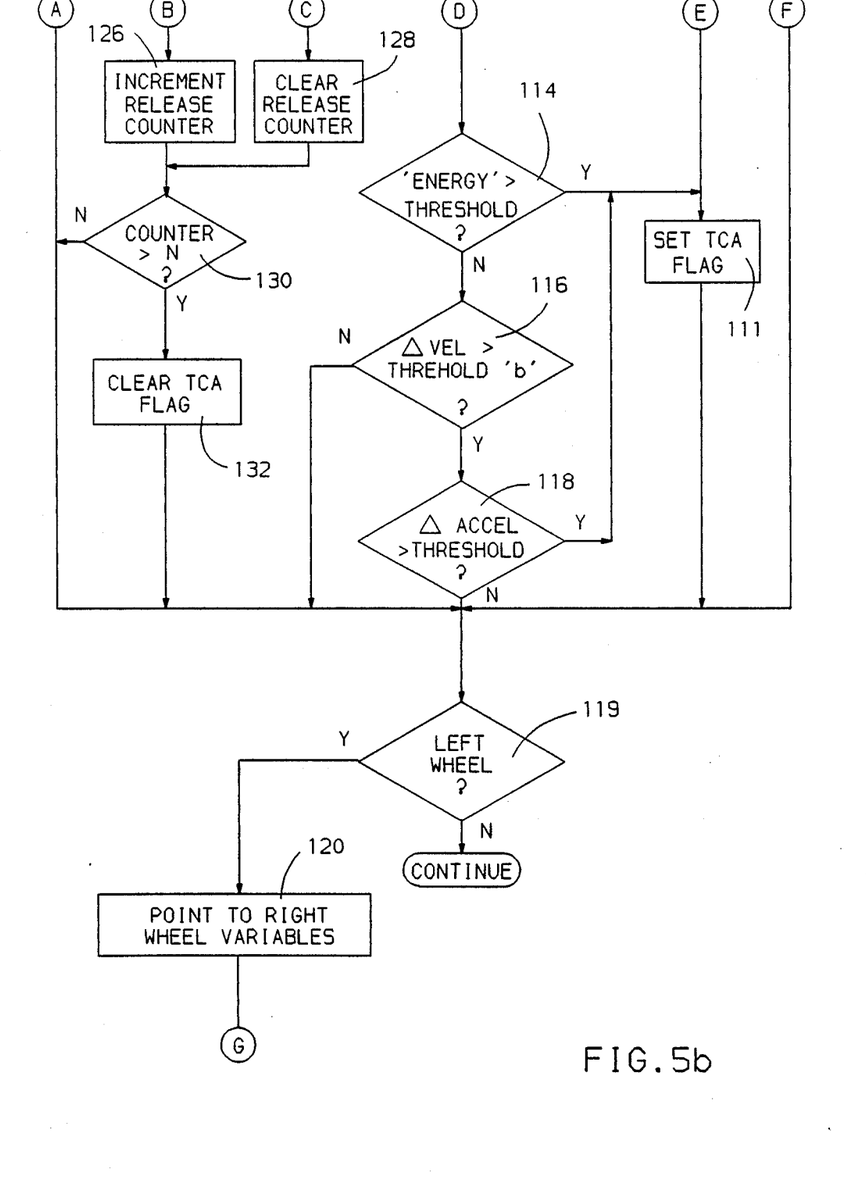

During the launch phase of the vehicle during which vehicle speeds are low, it is desirable to respond quickly to an excessive acceleration slip condition of the wheel to prevent a large wheel slip excursion with the resulting loss of traction and lateral stability. This is accomplished by controlling the brake pressure applied to the brake of the wheel in response to the spin ratio of the wheel (the ratio of the difference between the speeds of the slipping wheel and an undriven wheel to the speed of the slipping wheel) which can be large even though the velocity difference between the slipping wheel and the undriven wheel may be small. Accordingly, if the vehicle speed (which may be taken as the average speeds of the undriven wheels 14 and 16) is determined to be less than a calibration value V <100>, a motor current correction factor is determined from a memory lookup table storing values of the correction factor at memory locations addressed by the values of spin ratio and acceleration difference between the driven and undriven wheels <102>. The stored value of the correction factor may represent positive values for increasing brake pressure at the spinning wheel under conditions of high values of acceleration difference and/or spin ratio, may represent a zero correction factor to hold the brake pressure or may represent a negative value for releasing the brake pressure under conditions of low values of acceleration difference and/or spin ratio.

At higher vehicle speeds, the difference between the speeds of the driven and undriven wheels may be large even though the spin ratio is small. To control spin to maintain vehicle stability at these higher speeds, it is desirable to tightly control wheel slip in order to maintain lateral stability. This is accomplished by controlling the brake of a wheel having excess spin in response to the velocity difference between the driven and undriven wheels even though the spin ratio may be small. Accordingly, if the vehicle speed is determined to be greater than the calibration value V <100>, a motor current correction factor is determined from a lookup table storing values of the correction factor at memory locations addressed by the values of the velocity difference between the driven and undriven wheels and the acceleration difference between the driven and undriven wheels <104>. The stored value of the correction factor may represent positive values for increasing brake pressure at the spinning wheel under conditions of high values of acceleration difference and/or velocity difference, may represent a zero correction factor to hold the brake pressure or may represent a negative value for releasing the brake pressure under conditions of low values of acceleration difference and/or velocity difference. In one embodiment, the same lookup table may be utilized in each of the steps 102 and 104 by scaling the table axis in accord with spin ratio at vehicle velocities less than the threshold V and in accord with velocity difference when the vehicle speed is equal to or greater than V.

The determined motor current correction factor is then modified as a function of the jerk of the wheel <106>. Generally, the jerk (either positive or negative) is scaled and summed with the correction factor to provide jerk compensation. This then provides an increasing correction factor for higher jerk values and decreasing correction factors for negative jerk values. The final correction factor is compared to an apply threshold <108>. If the factor is greater than the threshold, and a Traction Control Active (TCA) flag is not already set <110> then a series of conditions are examined to determine if traction control should be requested. Traction control is requested <111> by setting the TCA flag if the difference between the velocities of the driven and undriven wheels is greater than a specified amount <112>, if the energy term is larger than a predetermined amount <114>, or if the delta velocity and delta acceleration are both greater than specified thresholds <116,118>. (The threshold in step 112 is larger than the threshold in step 118). If the TCA flag is already set <110> or has just been set <111>, the program advances to the right wheel or next routine, as appropriate <119,120>.

If the final correction factor is less than the apply threshold <108>, and the TCA flag is not set <122>, the program also advances to the right wheel or next routine <119,120>. If the correction factor is less than the threshold, and the TCA flag is set, the program checks whether the TCA flag should be cleared. When wheel spin has been less than a release threshold for a specified amount of time represented by N interrupt intervals <124,126,128,130>, the TCA flag is cleared <132> after which the program will then again advance to the next wheel or next routine <120,121>. If the specified amount of time has not lapsed, the program advances to the next wheel or next routine <120,121>.

Figure 6A:
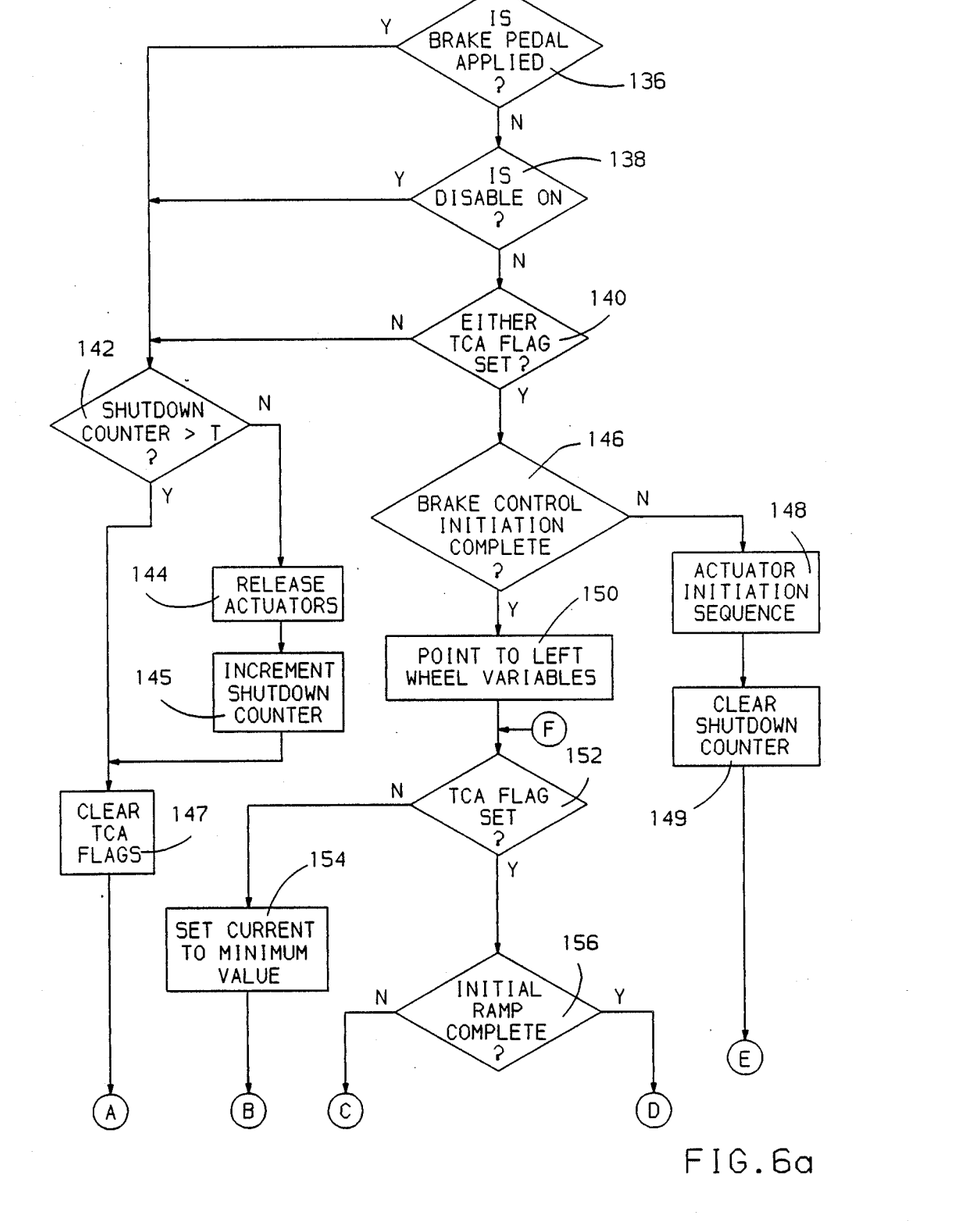
Figure 6B:
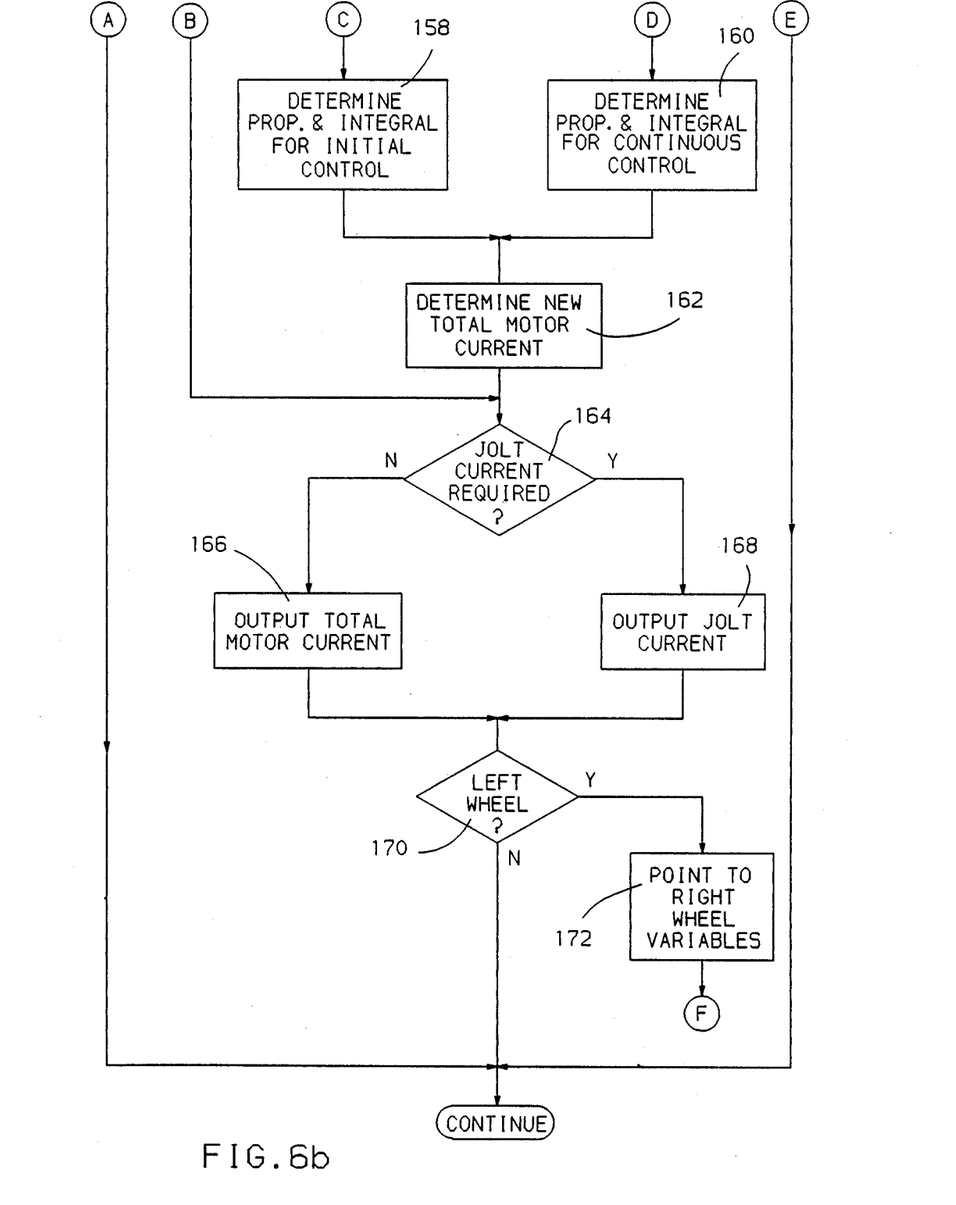

Upon completion of the mode determination routine, the brake control routine is entered (FIG. 6). The brake control routine first checks for brake pedal application <136>, a disable condition <138>, or a lack of either wheel's TCA flag being set <140>. If any of the above conditions are satisfied, brake pressure from both actuators will be released. This is done by applying reverse current to both brake actuator motors for a set period of time represented by T interrupt intervals <142,144,145>. All flags used in brake control are also cleared <147>. The reverse current on the brake motors returns the pistons 78 in the actuators 24,26 to their home positions and opens valves 86, allowing normal braking function.

If the brake pedal 52 is not actuated <136>, the disable switch 54 is open <138> or if either TCA flag is set <140>, the program checks for completion of an initiation sequence <146>. In the initiation sequence <148> a predetermined motor current command for each of the motors 68 of the actuators 24 and 26 is established for a predetermined amount of time. This is done to remove the brake system compliance and to ready the actuators 24 and 26 for control of the brake pressure to the wheel brakes 18 and 20. During initiation, the shutdown counter used to time the complete release of traction brake pressure <142,144,145> is also cleared <149>. If initiation is complete, brake actuator currents are then determined for each actuator before the routine is completed.

As with other routines, when the brake control initiation is complete <146>, control parameters are first determined for the left wheel, followed by the right wheel. Brake motor currents are determined in one of three ways. If the TCA flag is not set for a particular wheel <152>, the current is set to a minimum value <154> to ensure that the brake compliance removed in the initiation sequence 148 does not return. If the TCA flag is set, the program checks for completion of an initial 'ramp' of brake integral terms <156>. The initial ramp control <158> occurs immediately after the actuator initiation sequence 148 is complete. It allows the brake control integral terms to increase at a rate based primarily on engine torque as represented, for example, by the position of the primary throttle 34, which, being nearly constant during this short period, causes the integral term to ramp up to some value. The value is determined (the ramp ends) when the acceleration of the spinning wheel is found to be below a set threshold at the same time that the jerk for that wheel is negative. This ramp control allows for a rapid estimation of the integral portion of the brake control parameters, in absence of specific information about the vehicle tire/road interface. For instance, higher brake pressure (a faster ramp) will be necessary when a high engine torque acceleration is attempted on an icy surface than when a lower torque maneuver is attempted. On a higher coefficient surface, a shorter ramp is calculated as less brake pressure is needed to slow down the acceleration of the spinning wheel. During the ramp, proportional terms are also based on engine torque, but are modified by other vehicle parameters.

After the initial ramp is complete, brake control integral and proportional terms are then derived from the modified correction factor determined at step 106 in the brake mode determination routine of FIG. 5 to determine the current command to the motor 68 and therefore brake pressure to the wheel brake <160>. In one embodiment, integral and proportional correction values are obtained by multiplying the correction factor by predetermined constants. In another embodiment, the correction factors may be multiplied by complex terms that are variable as a function of predetermined vehicle parameters such as spin, delta velocity, engine torque and vehicle speed. The proportional correction value comprises the brake control proportional term and the sum of the prior integral term and the integral correction value comprises the brake control integral term. After the proportional and integral values are determined, total motor current is determined by adding together the proportional and integral terms <162>. Assuming a jolt current is not required <164> the determined motor current is outputted to the appropriate actuator controller 43 <166>.

Although the control interrupt cycle may be initiated every 10 msec, total motor current may not be changed every cycle. In the current embodiment, new commands are established by step 160 in varying periods of 10 to 30 msec, depending on the changing state of wheel spin and acceleration.

The jolt current is periodically outputted to the motors 68 <164,168> to help overcome seal friction in the actuators 24 and 26, ensuring the desired linear relationship between brake actuator current and brake pressure. A jolt current is considered required if the determined motor current remains in any state (increasing, decreasing or constant) for three interrupt intervals or if there has been a change from one of the states to another.

Figure 7:
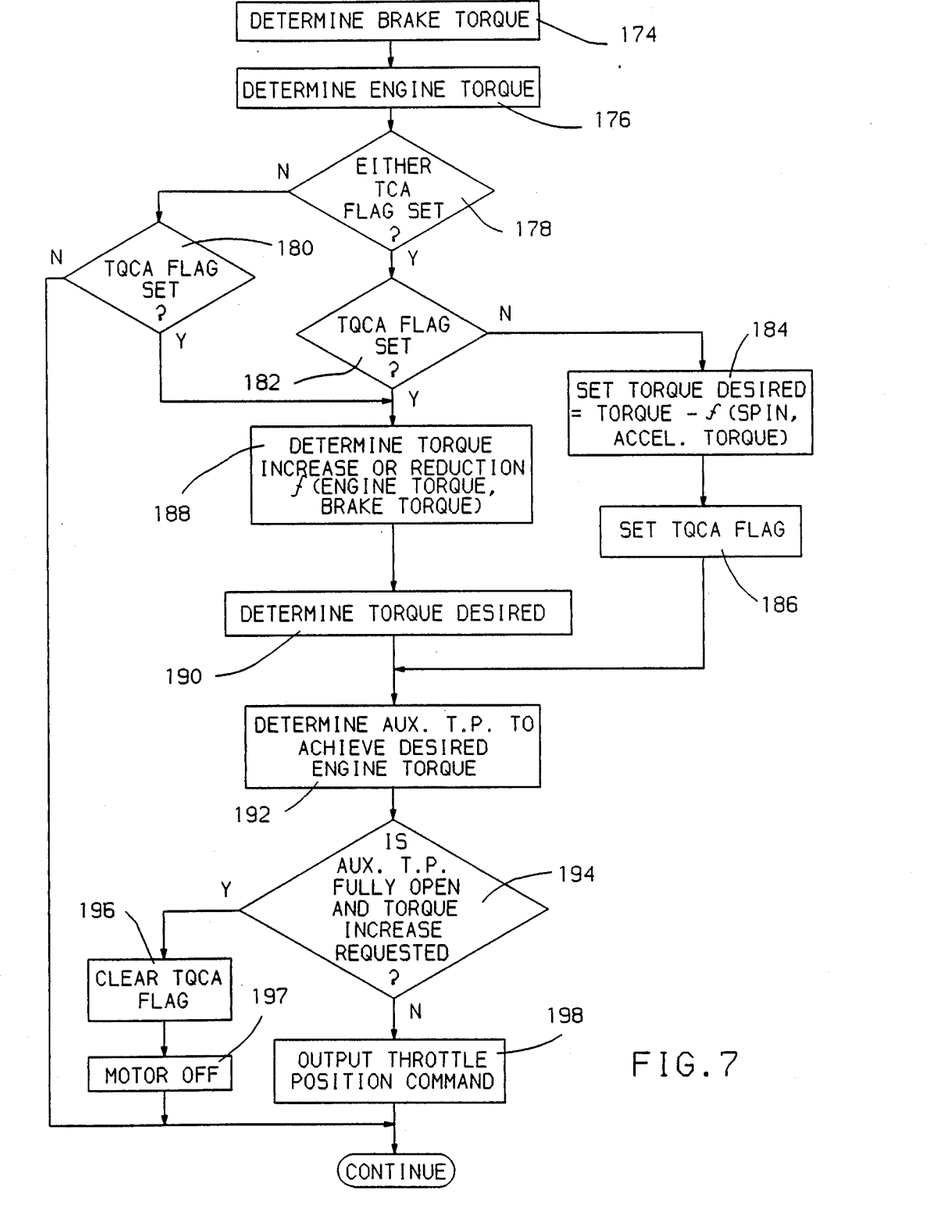

The routine next points to the right wheel and returns to step 152 <170,172> or when the brake control routine is completed for the right wheel <170>, a throttle control routine illustrated in FIG. 7 for assisting the brakes is executed. The throttle control routine generally monitors the control of the brakes by the brake control routine and provides for a transfer of control of acceleration spin to the engine by reducing the engine torque output. This allows the brake control routine to decrease the brake pressure applied to the brakes via the retrieval of negative correction factors from the lookup table <102,104> in response to decreasing delta acceleration, spin ratio or delta velocity as the engine torque output is reduced.

The throttle control routine first determines a value $T_b$ related to the total engine torque that is being absorbed by the brakes 18 and 20 of both wheels <174>. This is accomplished in this embodiment in accord with the expression $T_b = K_1 I_L + K_2 I_R$. $I_L$ and $I_R$ are the current commands to the actuators 24 and 27 and which represent the brake pressure at the respective wheel, $K_1$ and $K_2$ are scaling factors that are typically equal and which relate motor current to the engine torque being absorbed by the brakes.

The routine also determines engine output torque $T_E$ by use of a lookup table storing the predetermined relationship between engine output torque and engine speed and throttle position <176>. At this point, if neither brake actuator is active, and a Torque Control Active (TQCA) flag is not set <178,180> the routine is exited. If either actuator is active, and the TQCA flag has not been previously set, a throttle initiation sequence <184,186> is entered. This sequence sets an initial value of torque desired $T_D$ from the engine to be the current engine torque $T_E$ minus an amount related to spin, vehicle acceleration and engine torque <184>. This sequence puts an upper limit on engine output torque until the controlled brake pressure is low enough to justify return of engine power. For example, the upper limit is set higher for higher values of vehicle acceleration and set lower for higher spin ratios. During the initiation sequence, the TQCA flag is set <180>.

If either brake actuator is active, and the TQCA flag was previously set <178,182> then a value of engine torque increase or reduction from the present engine torque value is calculated as a function of engine torque and the total engine torque $T_b$ being absorbed by the brakes <188>. A torque reduction value $T_R$ is calculated in this embodiment by multiplying the amount that the total engine torque $T_b$ being absorbed by the two brakes exceeds a predetermined value $T_K$ by a scale factor F that has one value $F_1$ if the spin ratio of one wheel is greater than a reference spin ratio and a second value $F_2$ if the spin ratio of both wheels are greater than the reference spin ratio. The foregoing torque reduction value $T_R$ is defined by the expression $T_R = F_i(T_b - T_K)$. $T_K$ represents an acceptable level of engine torque that can be absorbed by the brakes. The scale factor F has a value less than one, such as 0.2 with $F_1$ associated with a single spinning wheel being less that $F_2$ associated with two spinning wheels.

Similarly, a torque increase value $T_I$ is provided having a value increasing as a predetermined function of the amount that the total engine torque $T_b$ being absorbed by the two brakes is below the predetermined value $T_K$ referred to above and as a function of the time that the spin ratio of both driven wheels is below a predetermined threshold.

Once the torque increase or decrease value is determined, a new value of torque desired $T_D$ is then determined by using the torque desired of the previous cycle adjusted by the above determined torque reduction or torque increase value <190> with the limitation that if a torque reduction were determined at step 188, the value of $T_D$ is limited to the value previously determined at step 184. In this manner, when in a torque reduction mode, the engine torque is not allowed to exceed the initial value of $T_D$ established in the throttle initiation sequence <184,186>.

Having arrived at a desired torque value, a position of the auxiliary throttle is determined that will cause the engine torque to achieve the desired value <192>. This may be done by using a series of look up tables storing the predetermined relationship between engine output torque and throttle position, engine speed and desired torque or by other means. If in the process of throttle control the auxiliary throttle position reaches a fully open position while a torque increase is being requested <194>, the TQCA flag is cleared <196> and motor current set to zero <197>. (This condition may not occur until after both brake actuators have been released). Otherwise, the routine outputs the determined auxiliary throttle position <198>. After the throttle position is commanded, the routine is exited.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A traction control system for a vehicle having an engine for applying a driving torque to first and second driven wheels, the system comprising, in combination:
   means for determining an excessive spin condition of each of the first and second driven wheels resulting from an excessive driving torque applied thereto from the engine;
   first and second wheel brakes for the first and second driven wheels, respectively;
   means for controlling the first brake to apply a braking force to the first driven wheel in response to a determined excessive spin condition of the first driven wheel, the applied braking force to the first driven wheel having a magnitude that is a predetermined function of selected wheel parameters representing a degree of excessive spin of the first driven wheel;
   means for controlling the second brake to apply a braking force to the second driven wheel in response to a determined excessive spin condition of the second driven wheel, the applied braking force to the second driven wheel having a magnitude that is a predetermined function selected wheel parameters representing the degree of excessive spin of the second driven wheel;
   means for determining a total value of engine torque being absorbed by the first and second wheel brakes represented by the sum of the braking forces applied to the first and second wheel brakes; and
   means for reducing the driving torque applied to the first and second driven wheels by the engine by an amount having a predetermined relationship to the total value of engine torque being absorbed by the first and second wheel brakes.

2. A traction control system for a vehicle having an engine for applying a driving torque to first and second driven wheels, the system comprising, in combination:
   means for determining an excessive spin condition of each of the first and second driven wheels resulting from an excessive driving torque applied thereto from the engine;
   first and second wheel brakes for the first and second driven wheels, respectively;
   means for controlling the first brake to apply a braking force to the first driven wheel in response to a determined excessive spin condition of the first driven wheel, the applied braking force to the first driven wheel having a magnitude that is a predetermined function of selected wheel parameters representing a degree of excessive spin of the first driven wheel;
   means for controlling the second brake to apply a braking force to the second driven wheel in response to a determined excessive spin condition of the second driven wheel, the applied braking force to the second driven wheel having a magnitude that is a predetermined function selected wheel parameters representing the degree of excessive spin of the second driven wheel;

means for determining a total value of engine torque $T_b$ being absorbed by the first and second wheel brakes represented by the sum of the braking forces applied to the first and second wheel brakes;

means for determining an engine torque reduction value $T_R$ in accord with the expression $T_R = F(T_b - T_K)$ when $T_b$ is greater than $T_K$, where F is a scale factor having a value less than one and $T_K$ is a predetermined engine driving torque value;

means for determining an engine torque increase value $T_I$ in accord with the expression $T_I = K(T_K - T_b)$ when $T_b$ is less than $T_K$, where K is a predetermined function; and means for reducing the driving torque applied to the first and second driven wheels by the engine by the torque reduction value $T_R$ when the total value of engine torque $T_b$ being absorbed by the first and second wheel brakes is greater than $T_K$ and increasing the driving torque applied to the first and second driven wheels by the engine by the torque increase value $T_I$ when the total value of engine torque $T_b$ being absorbed by the first and second wheel brakes is less that $T_K$.

3. The system of claim 2 wherein the scale factor F has a value $F_1$ when only one of the first and second wheels has a spin ratio greater than a reference spin ratio and a value $F_2$ when both wheels has a spin ratio greater than the reference spin ratio.

4. The system of claim 3 wherein the value of $F_1$ is less than the value of $F_2$.

5. The method of limiting the spin of first and second driven wheels of a vehicle having an engine applying a driving torque to the first and second driven wheels, the vehicle having first and second wheel brakes for braking the first and second driven wheels and the engine having an air intake system including a throttle bore and a throttle blade rotatable therein to selected positions for regulating the driving torque applied to the first and second driven wheels, the method comprising the steps of:

determining an excessive spin condition of each of the first and second driven wheels resulting from an excessive driving torque applied thereto from the engine;

controlling the first brake to apply a braking force to the first driven wheel in response to a determined excessive spin condition of the first driven wheel, the applied braking force to the first driven wheel having a magnitude that is a predetermined function of selected wheel parameters representing a degree of excessive spin of the first driven wheel;

controlling the second brake to apply a braking force to the second driven wheel in response to a determined excessive spin condition of the second driven wheel, the applied braking force to the second driven wheel having a magnitude that is a predetermined function selected wheel parameters representing the degree of excessive spin of the second driven wheel;

determining a total value of engine torque being absorbed by the first and second wheel brakes represented by the sum of the braking forces applied to the first and second wheel brakes;

measuring the position of the throttle blade;
measuring engine speed;

determining the value of the driving torque applied to the first and second driven wheels by the engine from the measured values of the throttle blade position and engine speed;

reducing the determined value of the driving torque by an amount having a predetermined relationship to the total value of engine torque being absorbed by the first and second wheel brakes;

determining the throttle position to produce the reduced value of the driving torque at the measured engine speed; and positioning the throttle blade at the determined position to reduce the driving torque applied to the driven wheels by the engine.

6. The method of limiting the spin of first and second driven wheels of a vehicle having an engine applying a driving torque to the first and second driven wheels, the vehicle having first and second wheel brakes for braking the first and second driven wheels and the engine having an air intake system including a throttle bore and a throttle blade rotatable therein to selected positions for regulating the driving torque applied to the first and second driven wheels, the method comprising the steps of:

determining an excessive spin condition of each of the first and second driven wheels resulting from an excessive driving torque applied thereto from the engine;

controlling the first brake to apply a braking force to the first driven wheel in response to a determined excessive spin condition of the first driven wheel, the applied braking force to the first driven wheel having a magnitude that is a predetermined function of selected wheel parameters representing a degree of excessive spin of the first driven wheel;

controlling the second brake to apply a braking force to the second driven wheel in response to a determined excessive spin condition of the second driven wheel, the applied braking force to the second driven wheel having a magnitude that is a predetermined function selected wheel parameters representing the degree of excessive spin of the second driven wheel;

determining a total value of engine torque $T_b$ being absorbed by the first and second wheel brakes represented by the sum of the braking forces applied to the first and second wheel brakes;

determining an engine torque reduction value $T_R$ in accord with the expression $T_R = F(T_b - T_K)$ when $T_b$ is greater than $T_K$, where F is a scale factor having a value less than one and $T_K$ is a predetermined engine driving torque value;

determining an engine torque increase value $T_I$ in accord with the expression $T_I = K(T_K - T_b)$ when $T_b$ is less than $T_K$, where K is a predetermined function;

measuring the position of the throttle blade;
measuring engine speed;
determining the valve of the driving torque applied to the first and second driven wheels by the engine from the measured values of the throttle blade position and engine speed;

adjusting the determined value of the driving torque by reducing the determined value torque by the torque reduction value $T_R$ when the total value of engine torque $T_b$ being absorbed by the first and second wheel brakes is greater than $T_K$ and increasing the determined value by the torque increase value $T_I$ when the total value of engine torque $T_b$ being absorbed by the first and second wheel brakes is less that $T_K$;

determining the throttle position to produce the adjusted value of the driving torque at the measured engine speed; and positioning the throttle blade at the determined position so as to cause the engine to apply the adjusted driving torque to the driven wheels.

* * * * *